United States Patent
Mannava et al.

(10) Patent No.: US 7,328,368 B2
(45) Date of Patent: Feb. 5, 2008

(54) DYNAMIC INTERCONNECT WIDTH REDUCTION TO IMPROVE INTERCONNECT AVAILABILITY

(75) Inventors: Phanindra K. Mannava, Folsom, CA (US); Victor W. Lee, San Jose, CA (US); Akhilesh Kumar, Sunnyvale, CA (US); Doddaballapur N. Jayasimha, Sunnyvale, CA (US); Ioannis T. Schoinas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 10/801,448

(22) Filed: Mar. 12, 2004

(65) Prior Publication Data

US 2005/0204193 A1    Sep. 15, 2005

(51) Int. Cl.
 *G06F 11/00* (2006.01)
(52) U.S. Cl. .............................. 714/8; 714/17; 714/18; 714/43; 714/56
(58) Field of Classification Search .................. 714/17, 714/18, 43, 56, 8
See application file for complete search history.

(56) References Cited

U.S. PATENT DOCUMENTS

| | | |
|---|---|---|
| 6,347,362 B1 | 2/2002 | Schoinas et al. |
| 6,662,276 B2 | 12/2003 | Schoinas |
| 6,971,098 B2 | 11/2005 | Khare et al. |
| 2003/0061476 A1* | 3/2003 | Phelps et al. ............... 713/100 |
| 2005/0081080 A1* | 4/2005 | Bender et al. ................. 714/2 |
| 2005/0114601 A1 | 5/2005 | Ramakrishnan |
| 2005/0125580 A1 | 6/2005 | Madukkarumukumana et al. |
| 2005/0132365 A1* | 6/2005 | Madukkarumukumana et al. ............................ 718/1 |
| 2005/0135176 A1 | 6/2005 | Ramakrishnan et al. |
| 2005/0138304 A1 | 6/2005 | Ramakrishnan et al. |
| 2005/0188064 A1 | 8/2005 | Schoinas |
| 2005/0273602 A1 | 12/2005 | Wilson et al. |
| 2005/0273633 A1 | 12/2005 | Wilcox et al. |
| 2005/0273635 A1 | 12/2005 | Wilcox et al. |

OTHER PUBLICATIONS

U.S. Appl. No. 10/859,656; Title: Packet Exchange For Controlling System Power Modes; Inventor: Jeffery Wilcox; filed Jun. 2, 2004.
U.S. Appl. No. 10/956,630; Title: Fault Processing for Direct Memory Access Address Translation; Inventor: Rajesh Madukkarumukumana; filed Sep. 30, 2004.
U.S. Appl. No. 10/956,206; Title: Caching Support for Direct Memory Access Address Translation; Inventor: Ioanis Schoinas; filed Sep. 30, 2004.
U.S. Appl. No. 10/956,198; Title: Address Translation for Input/Output Devices Using Hierarchical Translation Tables; Inventor: Ioannis Schoinas; filed Sep. 30, 2004.

(Continued)

*Primary Examiner*—Robert Beausoliel
*Assistant Examiner*—Charles Ehne
(74) *Attorney, Agent, or Firm*—Robert Anderson; Intel Corporation

(57) ABSTRACT

In some embodiments an apparatus includes a transmission error detector to detect an error of a transmission of an interconnect and a transmitting agent to retry the transmission in response to the detected error. The apparatus also includes a hard failure detector to detect a hard failure of the interconnect if the retry is unsuccessful, and a transmission width reducer to reduce a transmission width of the interconnect in response to the hard failure detector. Other embodiments are described and claimed.

22 Claims, 6 Drawing Sheets

OTHER PUBLICATIONS

U.S. Appl. No. 10/957,306; Title: Performance Enhancement of Address Translation Using Translation Tables Covering Large Address Spaces; Inventor: Ioannis Schoinas; filed Sep. 30. 2004.

U.S. Appl. No. 11/011,300; Title: Method, System, and Apparatus for Dynamic Reconfiguration of Resources; Inventor: Mani Ayyar; filed Dec. 13, 2004.

U.S. Appl. No. 11/011,801; Title: Method, System, and Apparatus for System Level Initialization; Inventor: Mani Ayyar; filed Dec. 13, 2004.

U.S. Appl. No. 11/026,314; Title: Direct Memory Access (DMA) Address Translation Between Peer Input/Output (I/O) Devices; Inventor: Rajesh Madukkarumukumana; filed Dec. 29, 2004.

U.S. Appl. No. 11/321,213; Title: Firm Partitioning in a System With a Point-to-Point Interconnect; Inventor: Ioannis Schoinas; filed Dec. 28, 2005.

U.S. Appl. No. 11/284,520; Title: In Band Configuration Agent For Link Based Computing System; Inventor: Eric Delano; filed Nov. 21, 2005.

U.S. Appl. No. 11/320,923; Title: Conditional and Vectored System Management Interrupts; Inventor: Mani Ayyar; filed Dec. 28, 2005.

* cited by examiner

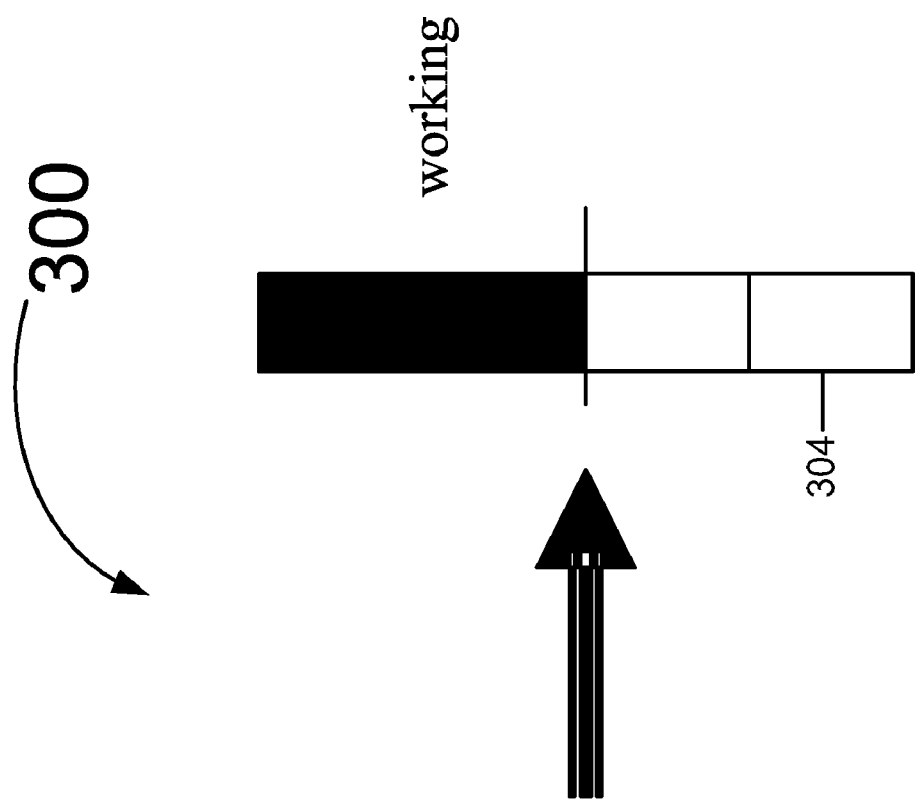
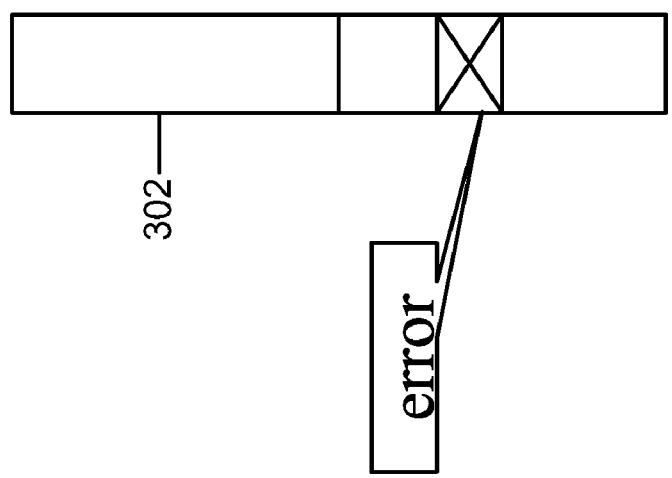
FIG 3

DYNAMIC INTERCONNECT WIDTH REDUCTION TO IMPROVE INTERCONNECT AVAILABILITY

TECHNICAL FIELD

The inventions generally relate to dynamic interconnect width reduction to improve interconnect availability.

BACKGROUND

Interconnects may be point-to-point interconnects connecting two components together (for example, two components on the same circuit board or two components coupled to two different boards). Interconnects may be bi-directional in that they can be used to transmit signals in an outgoing and an incoming direction, for example. The interconnect width may be scalable from one bit (that is, a serial interconnect) to multiple bits in parallel. Many different types of components may be connected using interconnects, such as processors, memory bridges, input/output (I/O) hubs, etc. Interconnects may be any type of bus, such as an I/O bus. Interconnects may also be referred to as "links". Interconnects in use today are typically required to have all channels thereof operating correctly at all times. Any single channel (or component) failure will typically cause the entire interconnect (such as a bus) to be non-operational before any reconfiguration of the link (interconnect) may be performed.

Generic interconnects connecting two or more components typically include logic (such as bus logic in the case of a bus interconnect) and one or more communication channels in each direction used to carry control information and data. The logic exists on each component of the interconnect between a data link layer and a physical layer. The communication channels are the minimum building blocks for the physical layer. Typical designs for interconnects such as buses provide no redundancy and require all communication channels to be operational. Any single channel failure results in a complete failure of the entire interconnect.

Mechanisms have previously been developed to improve I/O bus reliability and availability. These mechanisms can be divided into two categories, those mechanisms that resolve intermittent failures and those that use redundancy to resolve failures.

An example of an intermittent failure that may be resolved using some mechanisms is where an alpha particle hits the bus while data transfer is occurring and corrupts the transmitted data. A previously implemented mechanism used to resolve intermittent failures such as this is referred to as a "Detect and Retry" mechanism. Typical error detection schemes that may be used as part of such a "Detect and Retry" mechanism include parity, ECC (error correction code), and CRC (cyclic redundancy check) schemes. When error detection schemes are coupled with retry, the I/O bus can ensure correct data transmission. A variation of a "Detect and Retry" mechanism is to include a reset after the error detection but before retrying the transmission. Such a modified mechanism can be particularly useful for point-to-point interconnects that use high-speed serial transceivers.

"Detect and Retry" mechanisms cannot handle hard failures such as broken wire or inoperable transceivers. Providing redundancy is the most common scheme used to resolve such hard failures. In response to such a hard failure, redundant I/O buses may be used to transport data, or alternatively, failover channels may be used when one or more channels have failed.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

FIG. 3 is a diagram illustrating interconnect width reduction according to some embodiments of the inventions.

DETAILED DESCRIPTION

Figure 1:
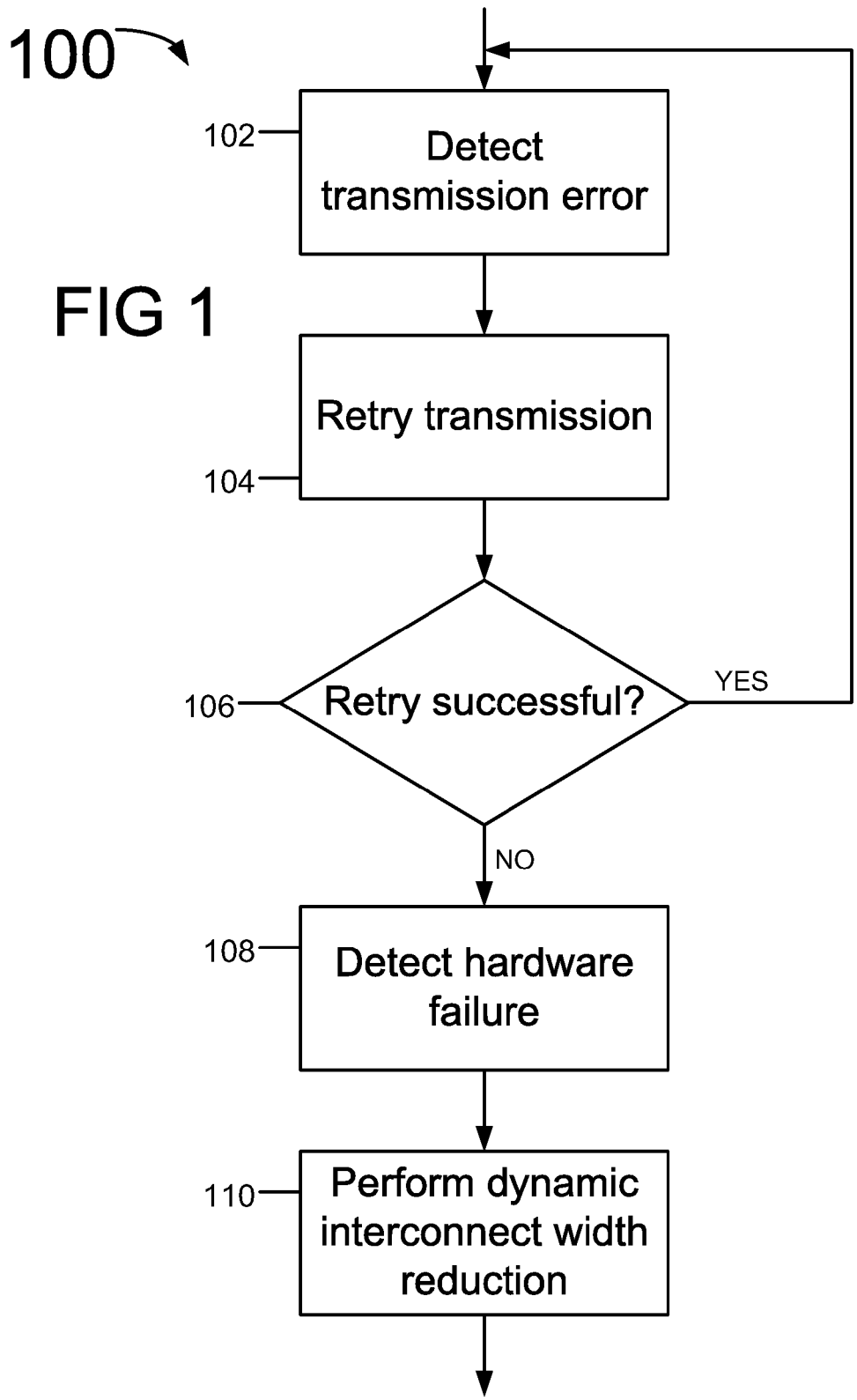
FIG. 1 is a flow diagram illustrating interconnect width reduction according to some embodiments of the inventions.

Some embodiments of the inventions relate to dynamic interconnect width reduction to improve interconnect availability.

In some embodiments a method includes detecting an error of a transmission of an interconnect, retrying the transmission in response to the detected error, detecting a hard failure if the retrying is unsuccessful, and reducing a transmission width of the interconnect in response to the detected hard failure.

In some embodiments an apparatus includes a transmission error detector to detect an error of a transmission of an interconnect and a transmitting agent to retry the transmission in response to the detected error. The apparatus also includes a hard failure detector to detect a hard failure of the interconnect if the retry is unsuccessful, and a transmission width reducer to reduce a transmission width of the interconnect in response to the hard failure detector.

In some embodiments an interconnect includes a transmission width to transmit information, a transmission error detector to detect a transmission error of the interconnect and a transmitting agent to retry a transmission in response to the detected error. The interconnect also includes a hard failure detector to detect a hard failure of the interconnect if the retry is unsuccessful, and a transmission width reducer to reduce a transmission width of the interconnect in response to the hard failure detector.

In some embodiments a system includes a first component, a second component and an interconnect. The interconnect includes a transmission width to transmit information between the first and second component, a transmission error detector to detect a transmission error of the interconnect and a transmitting agent to retry a transmission in response to the detected error. The interconnect also includes a hard failure detector to detect a hard failure of the interconnect if the retry is unsuccessful, and a transmission width reducer to reduce a transmission width of the interconnect in response to the hard failure detector.

In some embodiments an alternative solution is provided to the previously used "Detect and Retry" and redundant schemes. In some embodiments the "Detect and Retry" scheme is augmented to additionally handle hard failures, while avoiding the huge drawback of the redundant scheme of requiring additional communication channels.

In some embodiments dynamic interconnect link width reduction is implemented to bypass failed lanes within the interconnect link.

According to some embodiments width reduction is implemented without shutting down the link (or interconnect). After a hard error is detected the width reduction is performed in a manner such that it is transparent to any protocol stack components beyond the link layer. This allows the system to stay up and continue its work without causing a shut down of the system. Thus, it is not necessary to shut down the system along with the link (interconnect), reconfigure the width, and then restart.

In some embodiments interconnect transmission error detection is performed. In some embodiments the transmission error detection may be an error detection scheme based on a CRC (cyclic redundancy check) polynomial. In some embodiments the transmission error detection may be a parity detection scheme, an ECC (error correction code) scheme, or a CRC scheme. If a transmission error is detected then a retry is initiated to retry the transmission. If the transmission retry is unsuccessful then a hard failure detection operation is performed. In some embodiments, information resulting from the hard failure detection may be stored as an "error vector". The error vector information may be, for example, failed channels of the interconnect. In some embodiments the error vector is stored in a register. An initialization operation is used in some embodiments to reconfigure the interconnect link using the error vector information. The initialization operation may be performed using, for example, an initialization state machine. Failed channels of the interconnect link stored as the error vectors may be used by the initialization operation to reconfigure the interconnect. This may be accomplished by reducing the width of the interconnect so that it does not include the failed channels. For example, the interconnect may be set up to operate using one, two, or four of it's quadrants (or quarters) as follows:

1. If all quadrants of the interconnect are functional then select all four quadrants to be operable 2. If not all wires of the interconnect are working then try to combine two of the quadrants (for example, first try the top two quadrants, then try the bottom two quadrants, etc.)

3. If no two quadrants of the interconnect are working then select a single quadrant until a working quadrant is identified 4. If no working quadrant is found then identify failure of the interconnect Once the width reduction initialization operation has been completed a reset may be performed and the interconnect may operate using a reduced width and the failed transmission is retried. This process may be repeated until the transmission is error-free or the interconnect link is determined to have failed completely (and/or be inoperable).

Although quadrants have been used in this example of some embodiments, it is noted that many other arrangements of width reduction of the interconnect may be used according to some embodiments (for example, eighths of the interconnect, sixteenths, thirds, etc.)

In some embodiments a detection and retry is performed similar to that of the "Detect and Retry" scheme described above. An interconnect (such as, for example, a bus or an I/O bus) uses parity, ECC and/or CRC to detect if transmission failure has occurred. If an error is detected then the interconnect first retries the transmission. If the transmission retry fails then the interconnect initiates a reset and detects any hard failures. In some embodiments the order of the reset and hard failure detection can be interchanged (that is, the hard failure detection can be performed before and/or after the reset in some embodiments). Width reduction may be implemented without shutting down the link (or interconnect). After a hard error (or hard failure) is detected width reduction may be performed in a manner such that it is transparent to any protocol stack components beyond the link layer. This allows the system to stay up and continue its work without causing a shut down of the system. In this manner it is not necessary to shut down the system along with the link (interconnect), reconfigure the width, and then restart.

In some embodiments the reset can also fix additional device failures related to device calibration. The information obtained from the hard failure detection may be fed to an initialization state machine to reconfigure the interconnect (for example, an I/O bus) in a narrower width. This permits continued operation of the interconnect to occur until a replacement unit arrives, for example. The exact recombining of partial slices (reduced width) of the interconnect into a working set can be implemented in many different ways according to some embodiments.

In some embodiments once the hard error (or hard failure) has been detected the transmitter (or transmitting side of the interconnect) starts combining working quadrants of the interconnect and negotiates with the receiver (or receiving side of the interconnect) about the link width before finalizing the width in which to operate.

In some embodiments dynamic width reduction may be performed on a variety of different types of interconnects, such as serial interconnects, parallel interconnects, high speed interconnects, links, buses, and/or other types of interconnects. For example, according to some embodiments dynamic width reduction may be performed on a high-speed parallel interconnection.

According to some embodiments, a high speed parallel interconnect includes two agents, one at each end of the interconnect. Each agent of the interconnect includes logic to interface with an attached component, and also includes communication channels that form the physical layer of the interconnect link. A flow-controlled unit of transfer (or flow control packet) between the two agents is referred to as a "flit".

According to some embodiments an interconnect includes a flit based transmission error detection scheme based on a CRC polynomial. A CRC is calculated for each outgoing flit and checked at the receiving agent at a receiving end of the interconnect. If a mismatch is determined between the two CRCs at the transmitting agent end and receiving agent end of the interconnect then a transmission error is detected. The receiving agent then initiates a retry using logic included within the interconnect. Retry logic of the interconnect is used to initiate a retry and to signal retry failure. The interconnect also includes a hardware failure mechanism. Once the hardware failure is performed by the hardware failure mechanism resulting information (such as, for example, identification of failed channels) is stored in an "error vector". The error vector can be implemented, for example, as an internal register of the interconnect. An initialization state machine is used to reconfigure the interconnect using the "error vector". This reconfiguration may be performed using dynamic interconnect width reduction. For example, the interconnect link can be divided into four quadrants and the initialization can reconfigure the interconnect to operate in one, two, or all four quadrants. In some embodiments the hard failure detection mechanism may be built into the initialization mechanism (that is, the initialization state machine) and/or a reset mechanism. In some embodiments the hardware failure mechanism may be independent form any reset and initialization operations or mechanisms.

In some embodiments a transmission error is detected (for example, by comparing the CRC of the incoming flit to the computed value), the receiving agent initiates a retry on the flit. After receiving the retry request from the receiving agent, the transmitting agent resends the failed flit. If the transmission error persists (for example after retrying a few times), then the receiving agent initiates an interconnect reset. A hard failure is detected as part of the interconnect reset. Any failed channels are then recorded in the "error vector" register. The interconnect initialization state machine then reconfigures the interconnect based on the "error vector. The interconnect initialization state machine can reconfigure the interconnect using dynamic interconnect width reduction (for example, operating with one, two or four quadrants).

In some embodiments a selection order for the width reduction operation performed by the interconnect initialization state machine may be as follows:

If all quadrants are functional then select all four quadrants.

If not all wires are working then try to combine the top two quadrants, and if that doesn't work then try to combine the bottom two quadrants.

If it is not possible to combine the top two quadrants or the bottom two quadrants to obtain a working section of the interconnect then select a single quadrant starting from one end of the quadrants and working to another end of the quadrants.

If no working quadrant is found then a failure occurs.

Although a specific order of selecting a reduced width of the interconnect according to some embodiments is set forth above it is noted that modifications may be made in this selection according to other embodiments. That is, the selection order may be modified according to some embodiments, other possibilities may be added according to some embodiments such as combining two quadrants that are not the top two quadrants or bottom two quadrants, etc.

In some embodiments once the interconnect reset is completed, the interconnect can again operate and the retry logic can retry the transmission. This process may be repeated until the transmission is error free or the interconnect initialization state machine finds the interconnect to be completely failed and/or inoperable.

According to some embodiments a system is able to provide high availability, even in the face of permanent wire failures within the interconnect. This may be accomplished on all interconnects having a reasonable width. Link based interconnects that run at very high frequencies (for example, at 4-5 G transfers per second or more), any minor perturbation can cause the interconnect link to fail. In such situations a graceful degradation of the interconnect may be implemented. In this manner, a lower performing interconnect provides a high RAS (reliability availability serviceability) advantage compared to a failing interconnect.

In some embodiments error handling is implemented using dynamic interconnect width reduction. If an interconnect link level error is detected then interconnect link level retry is implemented. Once interconnect link level retry has "timed out" the interconnect moves to a dynamic interconnect width reduction mode (or self healing mode). The dynamic interconnect width reduction helps improve system availability. When one or more lanes (or channels) of an interconnect fail, the interconnect dynamically readjusts the interconnect width, if possible, and operation continues in a performance degraded mode. The width reduction can be, for example, from 20 bits (all four quadrants) to 10 bits (two of the four quadrants), and even further to 5 bits (one quadrant), if necessary. The width reduction can be implemented using, for example, quarter (or quadrant) interconnect link units. Any two lane failure may be covered by aggregating two working quarters. This can allow 100% recovery from one or two lane failures, if they are distributed over at most two of the four quarters. Priority of combining the quadrants can be the upper half or lower half of the quarters, and if these two are not possible, then different combinations of quarters. The interconnect can also degrade to a single quarter if no two working quarters are available.

FIG. 1 illustrates an interconnect width reduction flow 100 according to some embodiments. A transmission error of the interconnect is detected at 102. Once the transmission error is detected at 102 the transmission is retried at 104. If the transmission retry at 104 is determined to be successful at 106 flow returns to 102 to detect any further transmission errors. If the retry is not successful at 106 (for example, several retries have been performed without success and/or a time out has occurred) then flow continues to 108, where a hardware failure is detected. Then dynamic width reduction of the interconnect is performed at 110. According to some embodiments, once the hard error (or hard failure) has been detected at 108 the transmitter (or transmitting side of the interconnect) starts combining working quadrants of the interconnect and negotiates with the receiver (or receiving side of the interconnect) about the link width before finalizing the width in which to operate.

Figure 2:
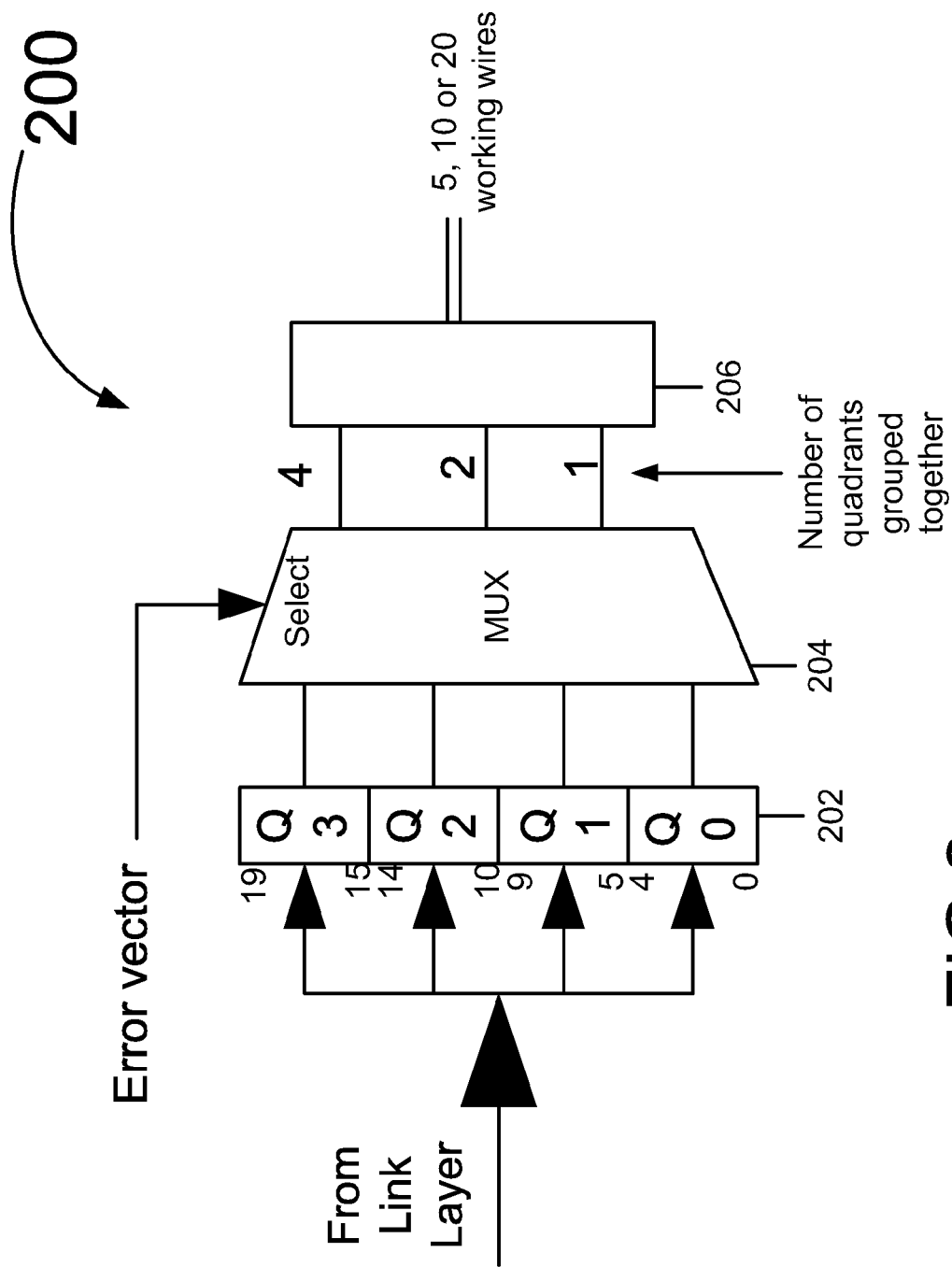
FIG. 2 is a circuit diagram illustrating interconnect initialization circuitry according to some embodiments of the inventions.

FIG. 2 illustrates an initialization interconnect state machine circuit 200 able to perform dynamic interconnect width reduction according to some embodiments. Initialization interconnect state machine circuit 200 includes an original interconnect link 202, a multiplexer (or multiplexers) 204, and a reduced width interconnect link 206. Interconnect links 202 and 206 are really the same interconnect, but illustrate working use of portions of the interconnect before and after width reduction is performed. The original interconnect link 202 is illustrated in FIG. 2 as a 20 wire interconnect link (or 20 channel link or 20 bit link or 20 lane link), but can be any number of bits, channels, wires, links, etc. in some embodiments. Original interconnect link 202 is split into four quadrants or quarters Q3, Q2, Q1 and Q0 as illustrated in FIG. 2 (for example, each quadrant having 5 bits, 5 wires, etc.) An error vector signal output (such as an identification of failed channels of the incoming interconnect link) from a hard failure detection is used by multiplexer 204 to select one or more of the quadrants Q3, Q2, Q1, Q0 to be provided as working portions of the reduced width interconnect link 206. For example, in some embodiments a selection of the quadrant order based on the error vector is made in the following preferred order: all four quadrants Q3Q2Q1Q0 grouped together, two quadrants Q3Q2 grouped together, two quadrants Q1 Q0 grouped together, Q3 alone, Q2 alone, Q1 alone, Q0 alone. In this manner 5, 10, or 20 working wires may be grouped together as a reduced width interconnect such that the interconnect can operate in one, two or all four quadrants, respectively.

FIG. 3 illustrates interconnect width reduction 300 according to some embodiments. Original interconnect 302 is illustrated as having an error (for example, a hard failure) shown by an "X" in the lower half of the interconnect. Width reduction is performed on the interconnect such that the opposite half of the interconnect from where the error occurred is used as the working portion of the interconnect, as illustrated by reduced width working interconnect 304.

The working portion of the interconnect 304 is shown in the top half thereof (shaded in FIG. 3).

Figure 4:
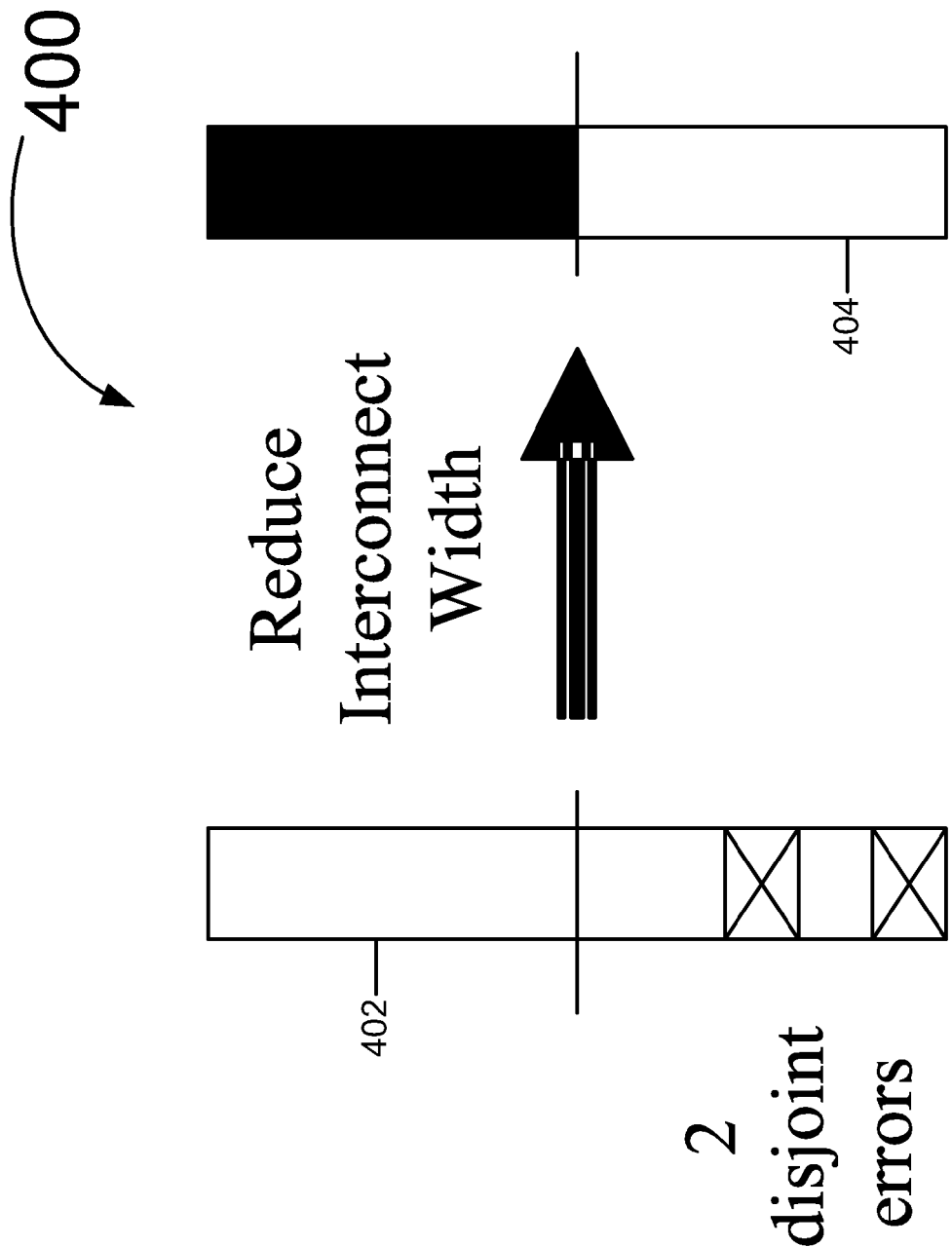
FIG. 4 is a diagram illustrating interconnect width reduction according to some embodiments of the inventions.

FIG. 4 illustrates interconnect width reduction 400 according to some embodiments. Original interconnect 402 is illustrated as having two disjointed errors each shown by an "X" in the lower half of the interconnect. Width reduction is performed on the interconnect such that the opposite half of the interconnect from where the errors occurred is used as the working portion of the interconnect, as illustrated by reduced width interconnect 404. The working portion of the interconnect 404 is shown in the top half thereof (shaded in FIG. 4).

Figure 5:
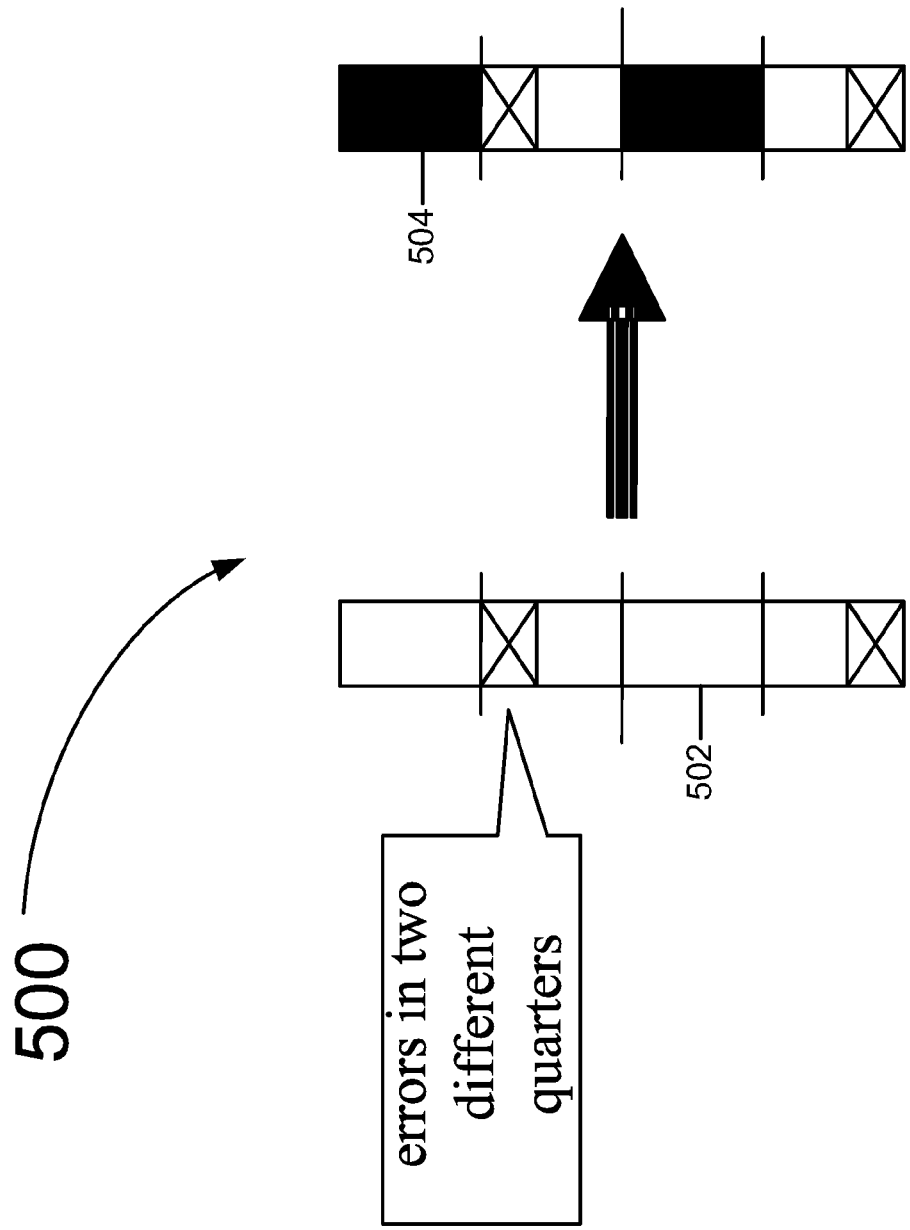
FIG. 5 is a diagram illustrating interconnect width reduction according to some embodiments of the inventions.

FIG. 5 illustrates interconnect width reduction 500 according to some embodiments. Original interconnect 502 is illustrated as having two errors in different quadrants (or quarters). Each of these errors is shown by an "X" in the second quadrant from the top (Q2) and the bottom quadrant (Q0) of the interconnect. Width reduction is performed on the interconnect such that the two quadrants without any errors (the top quadrant Q3 and the second from the bottom from the bottom quadrant 01) are used as the working portion of the interconnect, as illustrated by reduced width interconnect 504. The working portion of the interconnect 504 is shown shaded in FIG. 5.

Figure 6:
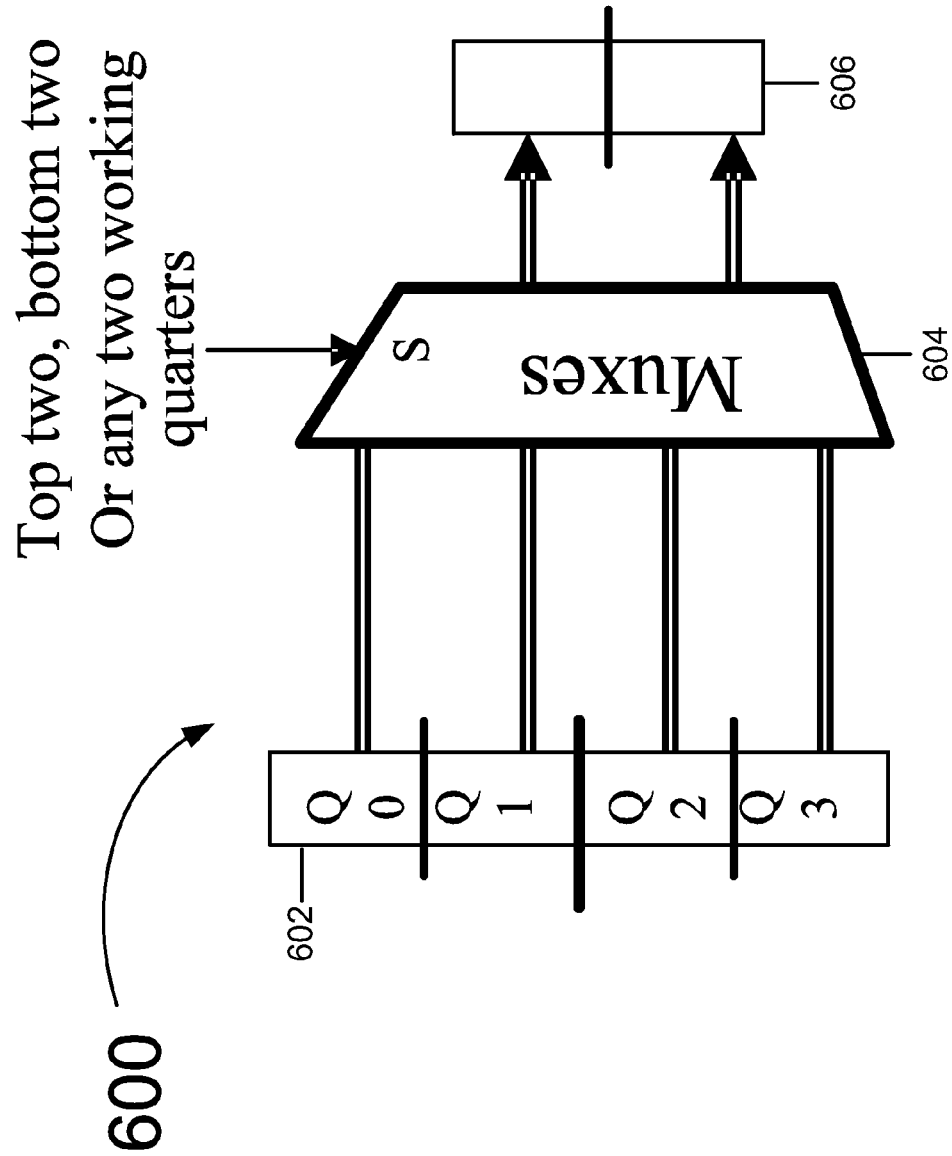
FIG. 6 is a diagram illustrating interconnect width reduction according to some embodiments of the inventions.

FIG. 6 illustrates interconnect width reduction 600 according to some embodiments. Original interconnect 602 is illustrated as having four quadrants Q0, Q1, Q2 and Q3. Multiplexer (or multiplexers) 604 are used to select working portions of the reduced width interconnect 606 in response to an error vector output from a hard failure detection. Width reduction may be performed, for example, to select the top two quadrants Q0Q1, the bottom two quadrants Q2Q3, or any other two quadrants of the interconnect as working portions thereof. In some embodiments any number of quadrants and combination of quadrants may be selected using multiplexer 604.

According to some embodiments the interconnect or interconnects may be point-to-point interconnects connecting two components together (for example, two components on the same circuit board or two components coupled to two different boards). The interconnect or interconnects may be bi-directional in that they can be used to transmit signals in an outgoing and an incoming direction, for example. Many different types of components may be connected using interconnects according to some embodiments, such as processors, a memories, a chip sets, memory bridges, an input/output (I/O) devices, I/O hubs, etc. Interconnects according to some embodiments may be any type of bus, such as an I/O bus.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state, or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:
    detecting an error of a transmission of an interconnect, the interconnect including at least three transmission portions;
    retrying the transmission in response to the detected error;
    detecting a hard failure if the retrying is unsuccessful; and
    reducing a transmission width of the interconnect in response to the detected hard failure by selecting one or more of the transmission portions of the interconnect to be used for transmission, and excluding at least one of the transmission portions of the interconnect from being used for transmission.

2. The method according to claim 1, wherein the reducing of the transmission width comprises selecting a working portion of the interconnect in response to the hard failure.

3. The method according to claim 1, wherein the detecting of the hard failure provides an indication of failed portions of the interconnect, and the reducing selects a working portion of the interconnect based on the indication of failed portions.

4. The method according to claim 1, wherein the detecting of the transmission error is performed using a cyclic redundancy check.

5. The method according to claim 1, further comprising replacing the interconnect with a replacement interconnect after the transmission width is reduced.

6. The method according to claim 1, further comprising retrying the transmission after the transmission width is reduced.

7. The method according to claim 1, wherein the interconnect is a bus.

8. An apparatus comprising:
   a transmission error detector to detect an error of a transmission of an interconnect, the interconnect including at least three transmission portions;
   a transmitting agent to retry the transmission in response to the detected error;
   a hard failure detector to detect a hard failure of the interconnect if the retry is unsuccessful; and
   a transmission width reducer to reduce a transmission width of the interconnect in response to the hard failure detector, the transmission width reducer including a multiplexer to select one or more of the transmission portions of the interconnect to be used for transmission, and to exclude at least one of the transmission portions of the interconnect from being used for transmission.

9. The apparatus according to claim 8, wherein the transmission width detector is to select a working portion of the interconnect in response to the hard failure detector.

10. The apparatus according to claim 8, wherein the hard failure detector is to indicate failed portions of the interconnect, and the transmission width detector is to select a working portion of the interconnect based on the indicated failed portions.

11. The apparatus according to claim 8, wherein the transmission error detector is to perform a cyclic redundancy check.

12. The apparatus according to claim 8, the transmitting agent to retry the transmission after the transmission width is reduced.

13. The apparatus according to claim 8, wherein the interconnect is a bus.

14. The apparatus according to claim 8, wherein the interconnect is an input/output bus.

15. The method of claim 1, wherein a number of the transmission portions of the interconnect is three, four, eight, or sixteen.

16. The method of claim 1, wherein a number of the transmission portions of the interconnect is four.

17. The method of claim 16, further comprising:
   if all four of the transmission portions are functional, then selecting all four to be used for transmission;
   if any of the transmission portions are not functional, then selecting two of the four transmission portions that are both functional to be used for transmission; and
   if no combination of two of the four transmission portions is functional, then selecting one of the four transmission portions to be used for tranmission.

18. The method of claim 1, further comprising:
   if any of the transmission portions are not functional, then the multiplexer to select two or more of the transmission portions that are functional to be used for transmission.

19. The apparatus of claim 8, wherein a number of the transmission portions of the interconnect is three, four, eight, or sixteen.

20. The apparatus of claim 8, wherein a number of the transmission portions of the interconnect is four.

21. The apparatus of claim 20, further comprising:
   if all four of the transmission portions are functional, then the multiplexer to select all four to be used for transmission;
   if any of the transmission portions are not functional, then the multiplexer to select two of the four transmission portions that are both functional to be used for transmission; and
   if no combination of two of the four transmission portions is functional, then the multiplexer to select one of the four transmission portions to be used for tranmission.

22. The apparatus of claim 8, further comprising:
   if any of the transmission portions are not functional, then the multiplexer to select two or more of the transmission portions that are functional to be used for transmission.

* * * * *